May 19, 1936.      F. W. SCHMIDT      2,041,376

SUPPORTING BAR AND RACK

Original Filed June 10, 1935

Inventor
Frank W. Schmidt
By Beaman & Langford
Attorney

Patented May 19, 1936

2,041,376

UNITED STATES PATENT OFFICE 2,041,376

SUPPORTING BAR AND RACK

Frank W. Schmidt, Jackson, Mich., assignor to Ryerson & Haynes, Inc., Jackson, Mich., a corporation of Michigan Original application June 10, 1935, Serial No. 25,826. Divided and this application June 22, 1935, Serial No. 27,851

3 Claims. (Cl. 74—575)

The present invention is a division of co-pending application Serial No. 25,826, filed June 10, 1935, relating to improvements in Vehicle jacking structure and is concerned with the tubular supporting bar and rack structure. While the invention is primarily concerned with ratchet jack structure and method of making the same, it has application generally to load supporting bar and rack structure with which operating pawls or dogs or other structure coact for effecting relative movement or supporting parts against relative movement.

Chiefly, the object of the present invention is to provide an inexpensive, durable, sheet metal bar and rack.

Another object is to provide a rack which is particularly designed as a load supporting column for a ratchet jack.

A further object is to provide a tubular sheet metal supporting bar and rack giving maximum rigidity with a minimum amount of material.

These and other objects residing in the specific construction and combination and arrangement of parts will more fully appear from the following description and as set forth in the appended claims.

Figure 1:
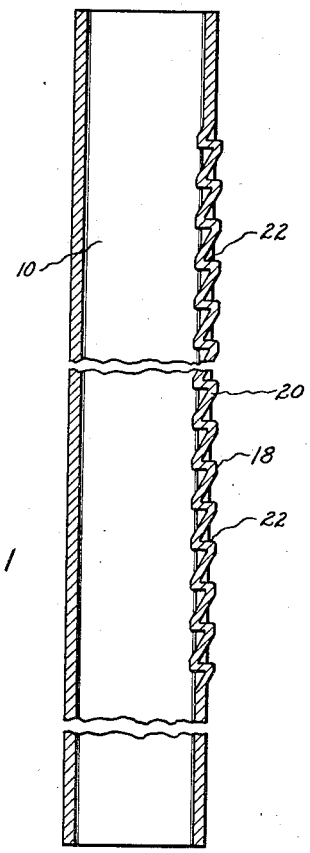
Figure 2:
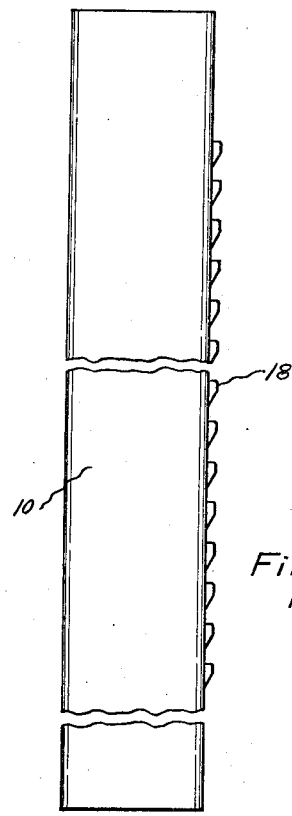
Figure 3:
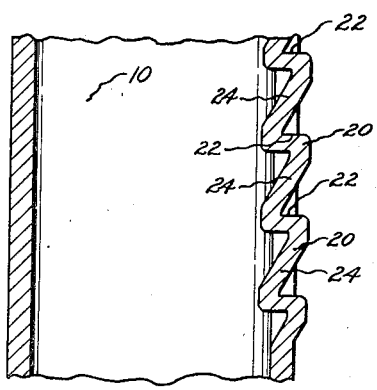
Figure 4:
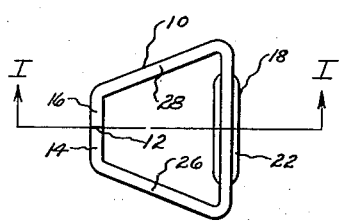

In the accompanying drawing, wherein I have illustrated the preferred form of the invention, Fig. 1 is a vertical section of the tubular rack taken on line I—I of Fig. 4, Fig. 2 is a side elevational view of the rack shown in section in Fig. 1, Fig. 3 is an enlarged fragmentary sectional view of the rack corresponding to the section shown in Fig. 1, and Fig. 4 is a plan view of one end of the tubular rack.

Referring to the drawing, the bar 10 is preferably of sheet metal formed in a tubular structure as shown in Fig. 4 providing a vertical joint at 12 with the vertical edge portions 14 and 16 in abutting relation. One of the vertical faces of the bar 10, preferably the face opposite the joint 12, has coined or stamped therein, by a power press operation, a rack section 18. The manner in which the rack section is coined in the bar 10 is an important part of the present invention and will be described with considerable detail.

In coining the rack 18 in the sheet metal strip from which the bar 10 is fabricated, the coining dies are so constructed that the deformation of the material constituting the tooth elements 20 of the rack is equally disposed upon opposite sides of the plane of the metal strip as will be apparent from Figs. 1, 3 and 4. This gives a balanced draw of the material in forming the tooth elements 20 and positions the load supporting webs 22 with which the pawls or dogs engage in the plane of the metal strip from which the elements 20 are coined. Heretofore it has been the practice in sheet metal racks for ratchet jacks, which have gone into commercial practice, to completely sever the metal in defining the teeth of the rack as shown in Patent No. 1,394,263. A departure from this has been made by the present invention in that increased strength and rigidity is provided by the webs 22 between each angularly disposed rib 24. This has been accomplished by leaving sufficient clearance in the coining dies so as to avoid severance of the material between adjacent ribs 24. Preferably sufficient clearance is provided in the dies so that in drawing the webs 22 the reduction in stock in the ribs 24 on opposite sides is sufficient to give the webs 22 considerable thickness. In practice the thickness of the stock constituting the webs 22 may be 15% to 25% less than that of the ribs 24, however, this is a matter of die design.

The inspection of Fig. 4 will disclose that the bar 10 as shown is of trapezoidal section although closely approaching a triangular section. Opposite vertical faces 26 and 28 of the bar 10 are designed at angles less than 90° to the vertical face in which the rack 18 is coined and converges toward the joint 12. If desired the faces 26 and 28 may be the opposite sides of a triangle converging to form the joint 12. However, it has been found desirable to turn the edges 14 and 16 in the manner shown in Fig. 4 giving a trapezoidal section for the reason that a more satisfactory joint 12 may be formed and a flat guiding surface parallel to that of the rack 18 is found desirable in some cases such as for guiding the bracket attachment of the ratchet jack as shown in the aforesaid application. As a rule, the vertical face in which the rack 18 is defined will be of the greater width than the width of the sections 26 and 28 which will be varied depending upon the strength and rigidity of the sections required. It should be readily apparent that the rigidity of the supporting bar and rack of the section shown in Fig. 4 is more than equal that of a square section, yet requires less stock in its fabrication. Moreover, by having the faces 26 and 28 disposed at less than at right angle to the rack 18, they are capable of giving lateral support and guiding action to structure acted upon by forces directed, for example, perpendicular to the face of the bar 10 in which the rack 18 is defined. This characteristic of the faces 26 and 28 is being employed in the aforesaid application to support and guide the attachment bracket and housing along the supporting bar and rack.

The vertical edges 14 and 16 of the bar structure constituting the joint 12 may be merely pressed into contiguous relationship leaving a longitudinally extending split or they may be welded or otherwise suitably joined along the joint 12. It is also to be understood that the location of the joint 12 may vary although as above stated, it is preferably located opposite the side of the bar structure in which the teeth are coined.

By coining or stamping the rack 18 and forming the bar 10 in the manner above described, it has been possible to obtain the required durability and rigidity of construction with stock of minimum width and thickness thus materially reducing the cost of production.

Having described my invention what I claim as new and desire to protect by Letters Patent is:

1. A bar and rack for ratchet jack structure and the like comprising a hollow sheet metal tube of substantially trapezoidal cross section, and teeth on the longer of the parallel sides of said tube.

2. A bar and rack for ratchet jack structure and the like comprising a split hollow sheet metal tube of substantially trapezoidal cross section having the split on the shorter of the parallel sides, and teeth on the longer of the parallel sides of said tube.

3. A bar and rack for ratchet jack structure and the like comprising a hollow sheet metal structure closed in cross-section and having one side with teeth therein, and opposed sides adjacent said first named side, said opposed sides being non-parallel and converging toward each other.

FRANK W. SCHMIDT.